United States Patent
Swanson et al.

(10) Patent No.: US 9,924,520 B2
(45) Date of Patent: Mar. 20, 2018

(54) BANDWIDTH MANAGEMENT IN A WIRELESS NETWORK

(71) Applicant: Honeywell International Inc., Morris Plains, NJ (US)

(72) Inventors: Norman Swanson, Douglassville, PA (US); Prasad Samudrala, Karnataka (IN); Sandeep Rudraraju, Telangana (IN); Amol Gandhi, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 184 days.

(21) Appl. No.: 14/952,652

(22) Filed: Nov. 25, 2015

(65) Prior Publication Data

US 2017/0150508 A1   May 25, 2017

(51) Int. Cl.
| | |
|---|---|
| *H04L 1/00* | (2006.01) |
| *H04W 4/00* | (2009.01) |
| *H04W 72/04* | (2009.01) |
| *H04W 28/02* | (2009.01) |

(52) U.S. Cl.
CPC ... *H04W 72/0486* (2013.01); *H04W 28/0247* (2013.01); *H04W 28/0289* (2013.01)

(58) Field of Classification Search
CPC ......... H04W 72/0486; H04W 28/0289; H04W 28/0247
See application file for complete search history.

(56) References Cited

U.S. PATENT DOCUMENTS

| 7,113,497 B2 | 9/2006 | Cromer et al. | |
|---|---|---|---|
| 7,668,201 B2 | 2/2010 | Sharony et al. | |
| 2003/0210672 A1* | 11/2003 | Cromer | H04L 47/10 370/338 |
| 2012/0082148 A1* | 4/2012 | Sperling | G06Q 30/04 370/338 |
| 2012/0243415 A1 | 9/2012 | Nishioka | |

* cited by examiner

*Primary Examiner* — Kiet Tang
(74) *Attorney, Agent, or Firm* — Jetter & Associates, P.A.

(57) ABSTRACT

A method for bandwidth management in a wireless network having wireless field devices (FDs) wirelessly coupled to a wireless access point associated to a wireless gateway. A first bandwidth usage percentage (BUP) consumed by the wireless access point and wireless router(s) is calculated from summed connected device weights. In response to a new FD or wireless router requesting to be connected to the network, a second BUP is calculated that would be consumed by the wireless access point and the wireless router(s) if the new FD or wireless router were connected to the wireless network. If the second BUP is not less than respective BUP thresholds, the new FD or router is prevented from being connected to the network. Disclosed bandwidth management can also be applied if an already connected FD in the network changes its path from one router or access point to another connected router or access point.

18 Claims, 4 Drawing Sheets

BANDWIDTH MANAGEMENT IN A WIRELESS NETWORK

FIELD

Disclosed embodiments relate to bandwidth management in a wireless network within an industrial process facility.

BACKGROUND

Wireless networks are frequently used in industrial process facilities to provide communication between various machines, processes and apparatus. For example, various types of wireless field devices can perform measurements throughout the industrial process facility and transmit the measured data via a wireless network to one or more connected devices such as computers or servers. The wireless network can also be used to transmit instructions and control signals to devices in the industrial process facility such as actuators, motors and pumps. The wireless network can include interconnected network devices such as wireless routers and wireless access points.

SUMMARY

This summary is provided to introduce a brief selection of disclosed concepts in a simplified form that are further described below in the Detailed Description including the drawings provided. This Summary is not intended to limit the claimed subject matter's scope.

Disclosed embodiments recognize if a large number of wireless field devices (FD's) attempt to connect or transmit to the same wireless routers or wireless access points in a short time period within an industrial process facility, the wireless network can become overloaded and the response time of the wireless network can be significantly degraded. Disclosed embodiments solve this problem by including a method for bandwidth management in a wireless network having FD's wirelessly coupled to a first wireless access point associated to a wireless gateway. The method includes calculating a first bandwidth usage percentage consumed by the first wireless access point and one or more wireless routers if included in the network between the FD's and the access point, from summed connected device weights based on connected device data including the number of connected FDs and wireless routers and the type of the FDs and wireless routers that are wirelessly connected thereto. In response to at least one new FD or new wireless router requesting to be connected to the wireless network from a type of the new FD or a type of the new wireless router, a second bandwidth usage percentage is calculated that would be consumed by the first wireless access point and the wireless router(s) if the new FD or new wireless router were connected to the wireless network.

The method further includes determining if the second bandwidth is less than a respective bandwidth usage percentage threshold of the first wireless access point and wireless router(s). In response to determining that the second bandwidth usage percentage is not less than the respective bandwidth usage percentage thresholds, the new FD or new wireless router is prevented from being connected to the wireless network.

The method further includes if a connected FD in the network is changing its connection from a connected wireless access point and/or router to different wireless access point and/or router, the bandwidth usage percentage is calculated for the new wireless access point and/or router connection. The new FD connection is allowed only if the bandwidth usage percentage is less than the respective bandwidth usage percentage threshold of the router or the wireless access point in the new possible connection path.

Disclosed embodiments also include a wireless network that comprise a wireless gateway communicatively coupled to a first wireless access point and at least one wireless router wirelessly coupled to the first wireless access point. Several FD's are wirelessly coupled to either the first wireless access point or the wireless router. The wireless gateway includes a wireless gateway controller. The wireless gateway controller is coupled to a storage device having a non-transitory machine readable storage medium. The storage device stores a disclosed bandwidth management program.

The wireless gateway controller is programmed to implement the bandwidth management program causing the wireless gateway controller to calculate a first bandwidth usage percentage consumed by the first wireless access point and by the wireless routers if included in the network between the FD's and the first wireless access point, from summed connected device weights based on connected device data including a number and type of the FD's and wireless routers that are wirelessly connected thereto. In response to at least one new FD or new wireless router requesting to be connected to the wireless network from a type of the new field device or new wireless router, a second bandwidth usage percentage is calculated that would be consumed by the first wireless access point and the wireless routers if the new FD or new wireless router were connected to the wireless network. The wireless gateway controller determines if the second bandwidth is less than a respective bandwidth usage percentage threshold of the first wireless access point and wireless routers. In response to determining that the second bandwidth usage percentage is not less than the respective bandwidth usage percentage thresholds, the new FD or wireless router is prevented from being connected to the wireless network.

DETAILED DESCRIPTION

Figure 1:
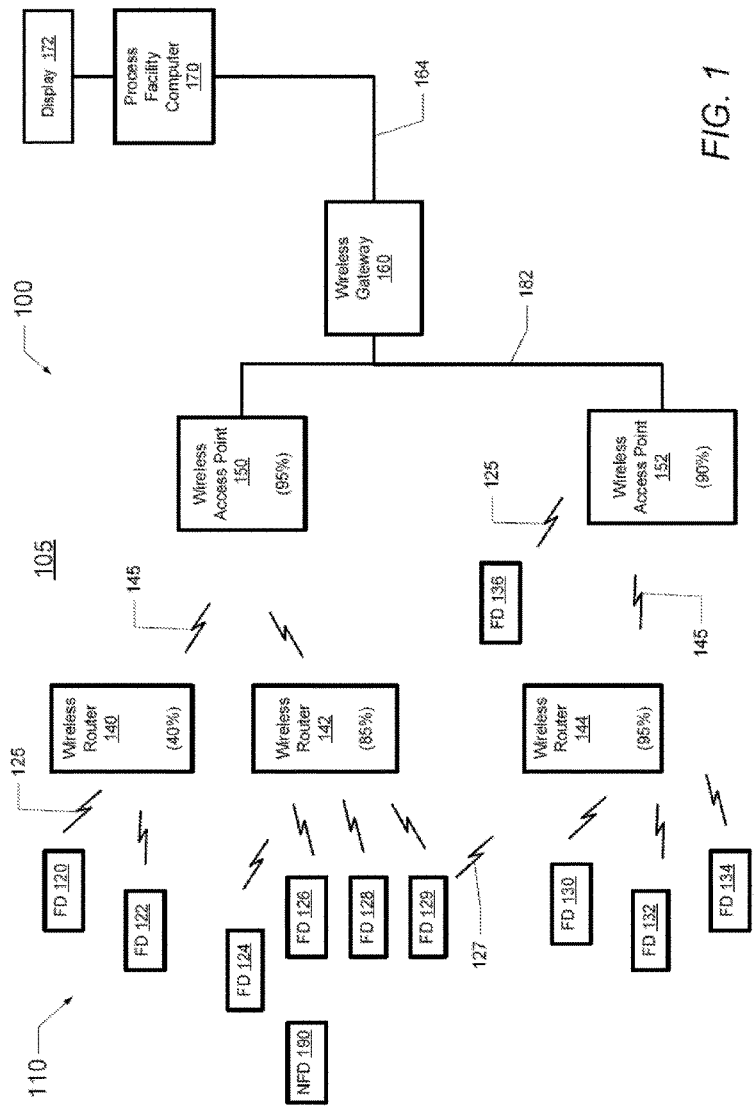
FIG. 1 is a block diagram of an example industrial process facility including a wireless network implementing disclosed bandwidth management, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 illustrates a block diagram of an example wireless network system 100 implementing disclosed bandwidth management in an industrial process facility 105. Industrial process facility 105 can be a variety of manufacturing plants, refineries or processing facilities that handle, process, store, or manufacture goods or services. Industrial process facility 105 can include manufacturing plants, chemical plants, crude oil refineries, ore processing plants, paper manufacturing plants, water processing plants and tank farms. These industries and facilities typically use continuous processes and fluid processing.

Wireless network system 100 can have a common interface for multiple wireless communication protocols. Wireless network system 100 include FDs 120 and 122 that are in wireless communication with wireless router 140 via wireless signals 125. The FD's 120, 122 and the other FD's referred to in this disclosure can comprise a wide variety of sensors and instruments that sense and measure a variety of attributes. For example, FD's 120 and 122 can comprise sensors that measure temperature, pressure, flow rates, chemical compositions, valve positions, pump speeds and vibration levels. Each of the FD's and wireless routers of this disclosure generally include a transceiver for wirelessly sending and receiving data and other information.

The FD's described herein can comprise multiple different FD types. For example the FD can comprise an analog input type FD, an analog output type FD, a discrete input FD, or a discrete output FD. Examples of different analog input type FD's include pressure sensors, temperature sensors, vibration sensors, level sensors and corrosion sensors. Examples of different analog output type FD's include valve positioning devices. Examples of different discrete input type FD's include switches. Examples of different discrete output type FD's include relays. FD's can support both analog and digital data transmission. For example, a multi discrete input transmitter can supports multiple discrete inputs such as converting any dry contact input such as received from limit level switches into a wireless input. An analog/discrete input transmitter can supports both analog and/or discrete inputs and can be used to convert any thermocouple, milli-volt, resistance Temperature Detector (RTD) or dry contact input such as from limit level switches into a wireless input. An input/output (I/O) Transmitter (i.e. transceiver) enables the transmission of discrete contact closure inputs, thermocouple, milli-volt and high level analog inputs wirelessly into their control systems, and also can control relays using digital inputs.

The wireless routers described herein can also comprise multiple different device types. For example the wireless router can comprise a line powered field router type or a battery powered field router type. Examples of a line powered field router type include line powered field router without sensors that forward data from devices connected to it to its parent and line powered field routers with sensors. Line powered field routers with sensors contain sensor data to be transmitted and also have the capability to forward data from other FD's connected to the field router with sensors. Examples of battery powered field routers include battery powered field routers without sensors that only forward the data from devices connected under it to its parent and battery powered field routers with sensors that have the capability to transmit data from connected FD's and to forwards data of other devices connected under it.

The various FD and wireless router types have varying bandwidth needs and requirements so that different types of FD's and wireless routers use different amounts of wireless bandwidth within wireless network 110. In one embodiment, FD types such as pressure or temperature digital input FD's generally need a small amount of data to be transmitted in a given time period and their bandwidth consumption is also small (e.g., data size: <70 bytes). FD types that support both digital input and digital output consume almost twice the bandwidth consumed by FD's that only have digital inputs. The bandwidth consumed by FD's with both digital input and output may be increased by double. (e.g., Input data size <70 bytes, output data size <70 bytes, combined <140 bytes). FD types such as wireless level measurement FD's send multiple analog/digital input and output data transmissions in a time period which consumes more wireless bandwidth (e.g., Data Size: >100 bytes). FD types such as wireless vibration FD's generally need to send large amounts of data in chunks which requires more even more wireless bandwidth (e.g., Data size: in Kbytes). In one embodiment, the wireless router types also have varying bandwidth needs and requirements. For example, bandwidth consumption in wireless routers is generally dependent on whether the wireless router is a battery powered type or a line powered type. Battery powered wireless router types typically consume more wireless bandwidth than line powered wireless router types.

Wireless network system 100 further includes FD's 124, 126, 128 and 129 that are in wireless communication with wireless router 142 via wireless signals 125. Wireless routers 140 and 142 are in communication with wireless access point 150 via wireless signals 145. Wireless access point 150 is a device that allows wireless devices such as wireless routers 140 and 142 to connect to a wired network using suitable wireless protocols. Wireless access point 150 is in communication with wireless gateway 160 via a wired communications network (wired network) 182 such as an Ethernet network. The wireless routers 140-144 and wireless access points 150-152 are each shown with their example current % bandwidth consumed (ranging from 40% to 95%) before the new FD (NFD) 190 shown is connected to any of wireless routers 140-144 or any of the wireless access points 150-152.

Wireless gateway 160 routes communication packets from wireless access point 150 to another wired or wireless network. In one embodiment, wireless gateway 160 includes security functions such as a firewall or the distribution and checking of security keys. Wireless gateway 160 can allow wireless devices such as wireless routers 140 and 142 to connect to a wired network using suitable wireless protocols. Wireless gateway 160 is in communication with one or more process facility computers 170 via a communication network 164. In one embodiment, communication network 164 can be an Ethernet network. Process facility computer is coupled to a display 172 such as a video display that can display information to an operator or other user.

Wireless network system 100 also includes FD's 130, 132 and 134 that are in wireless communication with wireless router 144 via wireless signals 125. Wireless router 144 is in communication with another wireless access point 152 via wireless signals 145. A FD 136 is in direct communication with wireless access point 152 via wireless signal 125. Wireless access point 152 is in communication with wireless gateway 160 via a wired network 182 such as an Ethernet network.

In one embodiment, wireless routers 140, 142 and 144 receive data transmitted wirelessly from FD's 120-134 and route the data to wireless access points 150 and 152 which in turn route the data to wireless gateway 160, which in turn route the data to process facility computer 170. Wireless access points 150 and 152 can also receive data directly from one or more FD's such as FD 136. Process facility computer 170 can send data and control information to wireless gateway 160 which in turn routes the data and control information to wireless access points 150 and 152. Wireless routers 140, 142 and 144 wirelessly route the data and control information received from wireless access points 150 and 152 by wirelessly transmitting to FD's 120-134. Wireless routers 140, 142 and 144, wireless access points 150 and 152 and wireless gateway form a wireless network 110 that can provide wireless coverage to FD's such as sensors and other instruments within industrial process facility 105.

As noted above, the wireless network system 100 also NFD 190 that is shown not currently connected to wireless network 110. In one embodiment, new NFD 190 can attempt to wirelessly connect to any of wireless routers 140-144 or attempt to wirelessly connect to any of wireless access points 150-152. If a disclosed bandwidth management program determines the bandwidth usage percentage including FD 190 in the wireless network 110 is less than respective bandwidth usage percentage thresholds of all the wireless access points 150-152 and the wireless routers 140-144, NFD 190 will be allowed to connect to the wireless network 110. Otherwise NFD will be prevented from being connected to the wireless network 110.

In one embodiment, a connected FD such as FD 129 can make a second wireless connection to another wireless router such as wireless router 144 via a second wireless signal 127. In this example, the FD 129 has a dual wireless connection to both of wireless routers 142 and 144 such that a redundant communication pathway is provided. A redundant wireless connection can also be made between a wireless router and two or more wireless access points.

Figure 2:
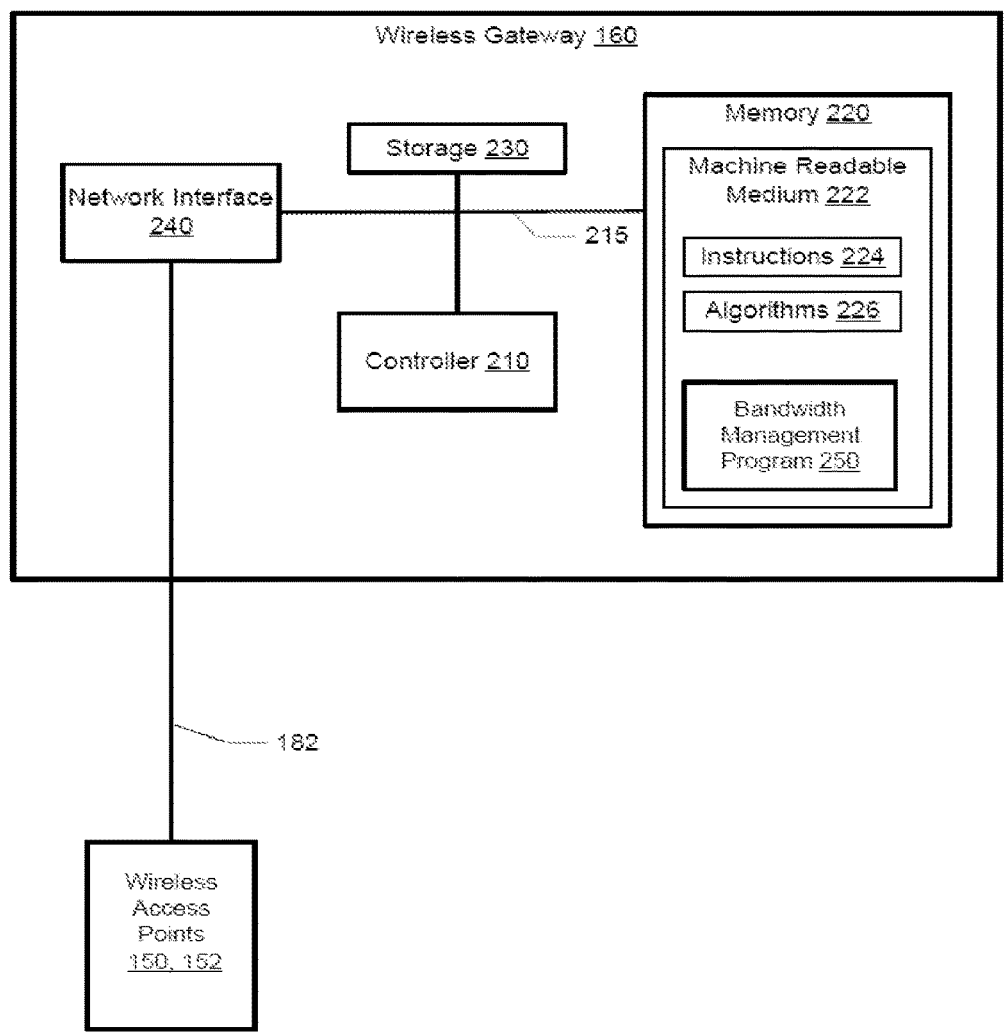
FIG. 2 is a block diagram of a wireless gateway implementing disclosed bandwidth management, according to an example embodiment.

FIG. 2 illustrates an example block diagram of wireless gateway 160 within which a set of instructions 224 and/or algorithms 226 can be executed causing the wireless gateway 160 to perform any one or more of the methods, processes, operations, applications, or methodologies described herein. Wireless gateway 160 includes one or more controllers or micro-controllers 210 and a memory 220, which communicate with each other via a system bus 215 which can represent a data bus and an address bus. Memory 220 includes computer readable storage medium 222 on which is stored one or more sets of software such as instructions 224 and/or algorithms 226 for execution by controller 210 embodying any one or more of the methodologies or functions described herein. Computer readable storage medium 222 can contain a bandwidth management program 250, which when executed by controller 210, manages access to wireless network 110.

While the computer readable storage medium 222 is shown in an example embodiment to be a single medium, the term "machine readable medium" or "computer readable storage medium" should be taken to include a single medium or multiple media (e.g., a centralized or distributed database, and/or associated caches and servers) that store the one or more sets of instructions. The term "machine readable medium" shall also be taken to include any medium that is capable of storing, encoding or carrying a set of instructions for execution by the computer system and that cause the computer system to perform any one or more of the methodologies shown in the various embodiments of the present invention. The term "machine readable medium" shall accordingly be taken to include, but not be limited to, solid-state memories, optical and magnetic media, and carrier wave signals.

Wireless gateway 160 further includes a storage device 230, such as a hard drive or solid state drive that is connected to and in communication with the system bus 215. Wireless gateway 160 further includes a network interface 240 that is connected to and in communication with the system bus 215. Network interface 240 provides a path for controller 210 to communicate with wireless access points 150 and 152 via wired network 182.

Figure 3:
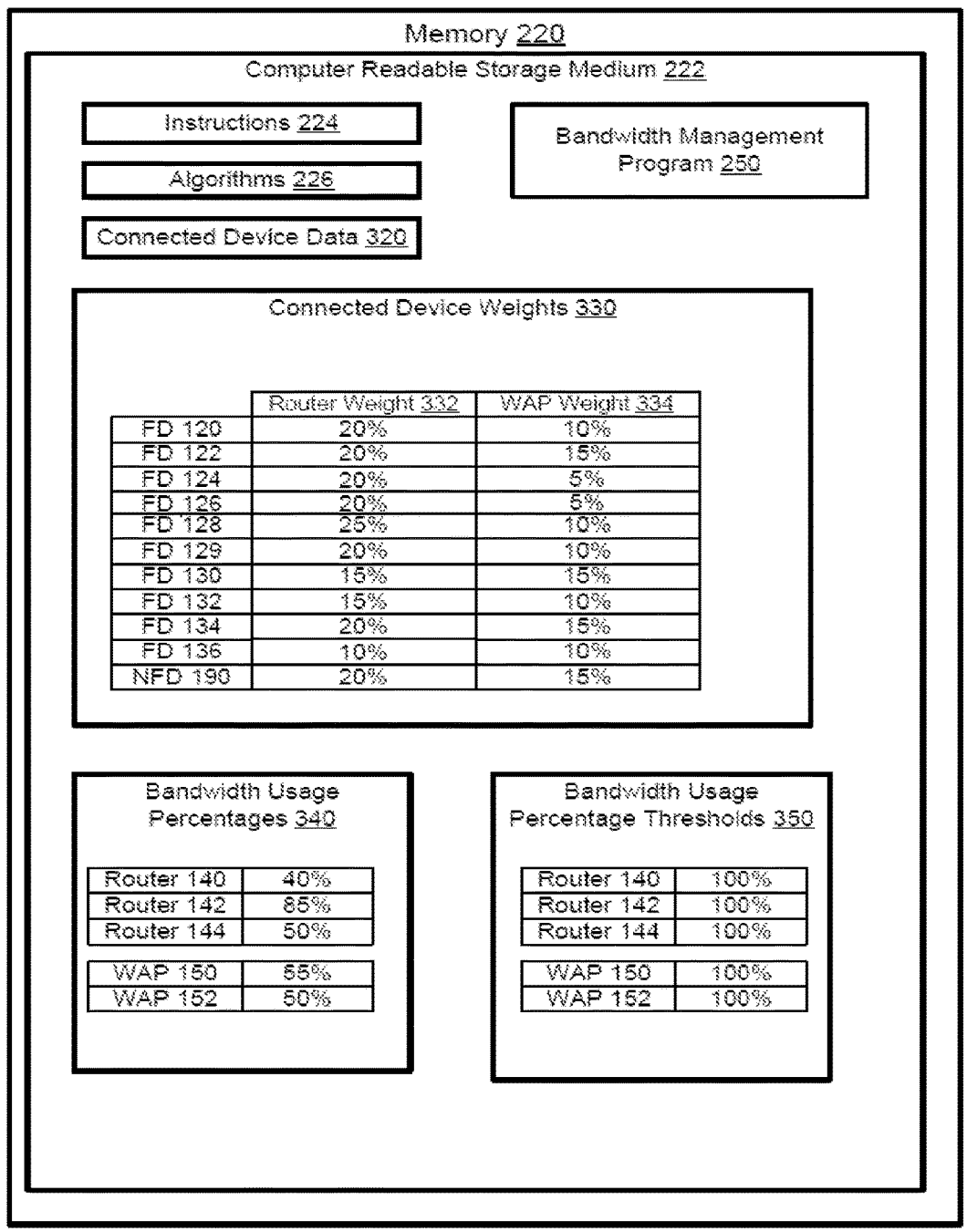
FIG. 3 is an example illustration of contents of a computer readable storage medium storing a disclosed bandwidth management program, according to an example embodiment.

FIG. 3 illustrates of contents of memory 220 and computer readable storage medium 222. Memory 220 includes instructions 224, algorithms 226, bandwidth management program 250 and connected device data 320. Bandwidth management program 250 executing on controller 210 manages access to the wireless network 110. Connected device data 320 is received from connected wireless devices or devices requesting to be connected to wireless network 110. Connected device data 320 can include the number of FDs and wireless routers connected to a wireless router and to a wireless access point and the type of the wireless devices (FDs and wireless routers) connected to wireless network 110.

Computer readable storage medium 222 can contain connected device weights 330 for each of the FD's 120-134 and NFD 190 that are connected or can be connected to wireless network 110. The connected device weights are proportional to the amount of bandwidth that each FD uses during wireless communications. The connected device weights 330 include a wireless router weight (router weight) 332 and a wireless access point weight 334 for each of the FD's 120-134 and NFD 190. Router weights 332 are proportional to the amount of bandwidth that each FD uses during wireless communications with wireless routers 140-144. Wireless access point weights 334 are proportional to the amount of bandwidth that each FD uses during wireless communications with wireless access points 150 and 152.

For example, in one embodiment FD 120 has a router weight 332 of 20% of the total available bandwidth of the wireless router and a wireless access point weight 334 of 10% of the total available bandwidth of the wireless access point. The wireless access point weights 334 are less than the router weights 332 because the wireless access points are only in wireless communication with the wireless routers while the wireless routers are in wireless communication with both the wireless access points and the FD's.

Computer readable storage medium 222 also contains bandwidth usage percentages 340 and thresholds 350 for each of the wireless routers 140-144 and wireless access points 150-152. Bandwidth usage percentages 340 are the sum of the connected device weights 330 for each of the FD's 120-134 that are wirelessly connected to an associated wireless router 140-144 and wireless access point 150-152. Bandwidth usage percentage thresholds 350 are the maximum allowed bandwidth percentage values for a wireless router or wireless access point. The current bandwidth percentage of a wireless router or an access point is the sum of the total connected device weights for each of the FD's 120-134 that are wirelessly connected to an associated wireless router 140-144 and wireless access point 150-152. In one embodiment, bandwidth management program 250 executing on controller 210, limits the bandwidth usage percentages 340 to be less than or equal to the corresponding bandwidth usage percentage threshold 350 for each wireless router and wireless access point.

With additional reference to FIG. 1, as an example, wireless router 140 is wirelessly connected to FD's 120, 122 and 124. Each of FD's 120-124 has a router device weight of 20%. Therefore, the sum of the router weights (bandwidth usage percentage 340) for the router 140 is 60%.

If a NFD 190 requests to be connected to wireless router 140, gateway controller executing bandwidth management program 250 retrieves the device weight 330 for the NFD 190, calculates a new bandwidth usage percentage including the device weight 330 for the NFD 190, and then determines if the new bandwidth usage percentage is less than the bandwidth usage percentage thresholds 350 of 100%. Adding the NFD 190 device weight of 15% to the current sum of the router weights (bandwidth usage percentage 340) for router 140 results in a new calculated bandwidth usage sum of 75%. Because the new calculated bandwidth usage percentage of 75% is less than the bandwidth usage percentage thresholds 350 of 100% for wireless router 140, the NFD 190 would automatically be allowed to wirelessly connect to wireless router 140 and wireless network 110.

Figure 4:
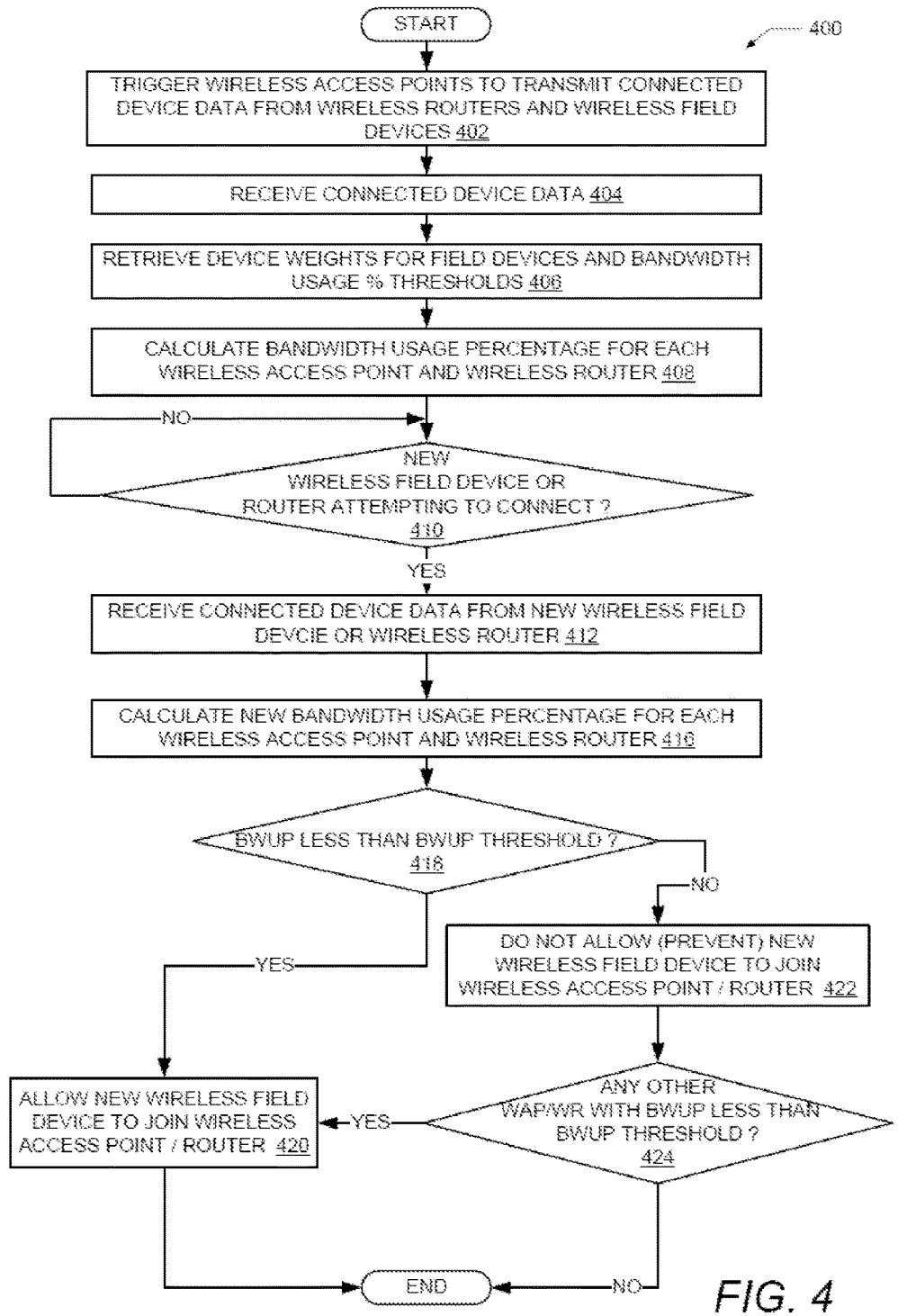
FIG. 4 is a flow chart that shows steps in an example method of bandwidth management in a wireless network, according to an example embodiment.

FIG. 4 provides a flow chart showing steps in an example method 400 for managing bandwidth in a wireless network system 100. Method 400 will be described with reference to FIGS. 1-4. Method 400 can be implemented via the execution of instructions 224 and/or algorithms 226 by controller 210 within wireless gateway 160 and specifically by the execution of bandwidth management program 250 by controller 210. Method 400 begins at the start block and proceeds to block 402 where controller 210 triggers the wireless access points 150 and 152 to transmit their respective connected device data 330 regarding their current wireless connections to wireless routers and field devices. Controller 210 receives the connected device data 330 from the first wireless access points (block 404). Controller 210 retrieves the corresponding connected device weights 330 for each of the connected FD's and retrieves the bandwidth usage percentage thresholds 350 (block 406).

At block 408, controller 210 calculates bandwidth usage percentages 340 consumed by the each of the wireless access point 150, 152 and one or more wireless routers 140-144, if included in the network between the FD's 120-136 and the access points 150, 152, from the summed connected device weights 330 based on the connected device data 320 including a number and type of the FD's 120-136 and the wireless routers 140-144 that are wirelessly connected thereto.

Controller 210 determines if at least one NFD 190 or new wireless router is requesting to be connected to the wireless network 110 (decision block 410). In one embodiment, a new wireless router can be attempting to establish one or more redundant communication paths to a wireless access point 150, 152 at decision block 410. In response to at least one NFD 190 or new wireless router not at that time requesting to be connected to the wireless network 110, controller 210 continues to monitor and determine if NFD 190 or new wireless router is requesting to be connected to the wireless network 110 at decision block 410.

In response to at least one NFD 190 or new wireless router requesting to be connected to the wireless network 110, controller 210 receives from NFD 190 or a new wireless router requesting connection the connected device data 320 that includes data indicating which of the wireless routers the new NFD 190 or new wireless router are to be connected with in the network (block 412). At block 416, controller 210 calculates a new bandwidth usage percentage 340 that would be consumed by each of the wireless access points 150, 152 and one or more wireless routers 140-144 which NFD 190 or a new wireless router has requested a wireless connection to.

Controller 210 determines if the new bandwidth usage percentage (BWUP in FIG. 4A) 340 is less than a respective bandwidth usage percentage threshold 350 of each of the wireless access points 150, 152 and one or more wireless routers 140-144 and new wireless router (decision block 418). In response to determining that the new bandwidth usage percentages 340 are less than the BWUP thresholds 350, controller 210 allows the NFD or wireless router to be connected to the wireless network 110 (block 420). Method 400 then ends.

In response to determining that the new bandwidth usage percentages 340 are not less than the BWUP thresholds 350, controller 210 prevents the NFD 190 or wireless router from being connected to the wireless network 110 (block 422). Controller 210 determines if there are any other wireless access points 150, 152 or wireless routers 140-144 available in wireless network 110 that have a bandwidth usage percentage 340 that is less than a respective bandwidth usage percentage threshold 350 (decision block 424). In response to determining that there are not any other wireless access points 150, 152 or wireless routers 140-144 available in wireless network 110 that have a bandwidth usage percentage 340 that is less than a respective bandwidth usage percentage threshold 350, method 400 ends. In response to determining that there is at least one other wireless access points 150, 152 or wireless routers 140-144 available in wireless network 110 that has a bandwidth usage percentage 340 that is less than a respective bandwidth usage percentage threshold 350, controller 210 allows the NFD or wireless router to be connected to the wireless network 110 (block 420). Method 400 then terminates.

For example, if NFD 190 that has a device weight of 20% was requesting to be connected to wireless router 142 that has a current BWUP of 85%, controller 210 would prevent the NFD 90 from being connected to wireless router 142. If the NFD 190 was connected to wireless router 142, the new BWUP of 105% would exceed the capacity or bandwidth usage percentage threshold of wireless router 142. If controller 210 rejects a connection with a particular NFD 190 or wireless router in the network, the NFD 190 or the new wireless router would try to connect to the network through another connected wireless router in the network (block 424) if it is visible (in communication range) to the NFD 190 (for example wireless router 144). Controller 210 can allow this new connection (NFD 190 to wireless router 144 and WAP 152) because the router 144 and WAP 152 have bandwidth usage percentages 340 that are within their bandwidth usage percentage threshold 350 limits even after a new NFD 190 is connected to the network through them.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. A method of bandwidth management in a wireless network having wireless field devices (FDs) wirelessly coupled to a first wireless access point associated to a wireless gateway comprising:
    calculating a first bandwidth usage percentage consumed by the first wireless access point and one or more wireless routers if included in the network between the FDs and the access point, from summed connected device weights based on connected device data including a number and a type of the FDs and wireless routers that are wirelessly connected thereto, wherein different ones of the types have different bandwidth requirements used in the calculating of the first bandwidth usage percentage, and wherein the FDs each include a sensor;
    responsive to at least one new FD or new wireless router requesting to be connected to the wireless network or to form a redundant wireless connection, from a type of said new FD or said new wireless router, calculating a second bandwidth usage percentage utilizing the bandwidth requirement for the type of the new FD or said new wireless router that would be consumed by the first wireless access point and the wireless routers if the new FD or new wireless routers were connected to the wireless network;
    determining if the second bandwidth usage percentage is less than respective bandwidth usage percentage thresholds of the first wireless access point and the wireless routers, and
    in response to determining that the second bandwidth usage percentage is not less than the bandwidth usage percentage thresholds, preventing the new FD or new wireless router from being connected to the wireless network.

2. The method of claim 1, further comprising:
    in response to determining that the second bandwidth usage percentage is less than the bandwidth usage percentage thresholds, allowing the new FD or new wireless router to be connected to the wireless network.

3. The method of claim 1, further comprising:
    determining if a second wireless access point associated with the wireless gateway is available in the wireless network;
    in response to determining that said second wireless access point associated with the wireless gateway is available in the wireless network, calculating a third bandwidth usage percentage that would be consumed by the second wireless access point and any respective wireless routers connected to the second wireless access point;
    determining if the third bandwidth usage percentage is less than respective bandwidth usage percentage thresholds of the second wireless access point and wireless routers; and
    in response to determining that the third bandwidth usage percentage is not less than the bandwidth usage percentage thresholds, preventing the new FD or new wireless router from being connected to the wireless network.

4. The method of claim 3, further comprising:
    in response to determining that the third bandwidth usage percentage is less than the bandwidth usage percentage thresholds, allowing the new FD or new wireless router to be connected to the wireless network.

5. The method of claim 1, further comprising:
    triggering the first wireless access point to transmit the connected device data;
    receiving, at a wireless gateway controller, the connected device data from the first wireless access point; and
    retrieving at least one device weight for the first wireless access point, the wireless routers and the FDs.

6. The method of claim 5, wherein the wireless gateway controller calculates the second bandwidth usage percentage that would be consumed by the first wireless access point and the wireless routers if the new FD or new wireless router were connected to the wireless network based in the connected device data and the connected device weights.

7. A computer program product, comprising:
    a non-transitory data storage medium that includes program instructions executable by a processor to enable said processor to execute a method for bandwidth management in a wireless network having wireless field devices (FDs) wirelessly coupled to a first wireless access point that is associated to a wireless gateway, wherein the FDs each include a sensor, and wherein an algorithm for bandwidth management is stored in said non-transitory data storage medium, said computer program product comprising:
        code for calculating a first bandwidth usage percentage consumed by the first wireless access point and one or more wireless routers if included in the network between the FDs and the access point, from summed connected device weights based on connected device data including a number and a type of the FDs and wireless routers that are wirelessly connected thereto wherein different ones of the types have different bandwidth requirements used in the calculating of the first bandwidth usage percentage;
        responsive to at least one new FD or new wireless router requesting to be connected to the wireless network or to form a redundant wireless connection, from a type of said new FD or said new wireless router, code for calculating a second bandwidth usage percentage utilizing the bandwidth requirement for the type of the new FD or said new wireless router that would be consumed by the first wireless access point and the wireless routers if the new FD or new wireless routers were connected to the wireless network;

code for determining if the second bandwidth usage percentage is less than respective bandwidth usage percentage thresholds of the first wireless access point and wireless routers, and in response to determining that the second bandwidth usage percentage is not less than the bandwidth usage percentage thresholds, code for preventing the new FD or new wireless router from being connected to the wireless network.

8. The computer program product of claim 7, wherein said computer program product further comprises:

in response to determining that the second bandwidth usage percentage is less than the bandwidth usage percentage thresholds, code for allowing the new FD or new wireless router to be connected to the wireless network.

9. The computer program product of claim 7, wherein said computer program product further comprises:

code for determining if a second wireless access point associated with the wireless gateway is available in the wireless network;

in response to determining that said second wireless access point associated with the wireless gateway is available in the wireless network, code for calculating a third bandwidth usage percentage that would be consumed by the second wireless access point and any respective wireless routers connected to the second wireless access point;

code for determining if the third bandwidth usage percentage is less than respective bandwidth usage percentage thresholds of the second wireless access point and wireless routers; and in response to determining that the third bandwidth usage percentage is not less than the bandwidth usage percentage thresholds, code for preventing the new FD or new wireless router from being connected to the wireless network.

10. The computer program product of claim 9, wherein said computer program product further comprises:

in response to determining that the third bandwidth usage percentage is less than the bandwidth usage percentage thresholds, code for allowing the new FD or new wireless router to be connected to the wireless network.

11. The computer program product of claim 7, wherein said computer program product further comprises:

code for triggering the first wireless access point to transmit the connected device data;

code for receiving, at a wireless gateway controller, the connected device data from the first wireless access point; and code for retrieving one or more connected device weights for the first wireless access point, the wireless routers and the FDs.

12. The computer program product of claim 11, wherein the wireless gateway controller calculates the second bandwidth usage percentage that would be consumed by the first wireless access point and the wireless routers if the new FD or new wireless router were connected to the wireless network based in the connected device data and the connected device weights.

13. A wireless network comprising:

a wireless gateway communicatively coupled to a first wireless access point, at least one wireless router wirelessly coupled to the first wireless access point;

a plurality of wireless field devices (FDs) wirelessly coupled to either the first wireless access point or the wireless router, wherein the FDs each include a sensor; and said wireless gateway including a wireless gateway controller, said wireless gateway controller coupled to a storage device having a non-transitory machine readable storage medium; wherein said storage device stores a bandwidth management program and said wireless gateway controller is programmed to implement said bandwidth management program causing said wireless gateway controller to:

calculate a first bandwidth usage percentage consumed by the first wireless access point and the wireless router if included in the network between the FDs and the first wireless access point, from summed connected device weights based on connected device data including a number and a type of the FDs and wireless routers that are wirelessly connected thereto wherein different ones of the types have different bandwidth requirements used in the calculating of the first bandwidth usage percentage;

responsive to at least one new FD or new wireless router requesting to be connected to the wireless network or to form a redundant wireless connection from a type of said new FD or said new wireless router, calculating a second bandwidth usage percentage utilizing the bandwidth requirement for the type of the new FD or said new wireless router that would be consumed by the first wireless access point and the wireless routers if the new FD or new wireless routers were connected to the wireless network;

determine if the second bandwidth usage percentage is less than a respective bandwidth usage percentage threshold of the first wireless access point and wireless routers; and in response to determining that the second bandwidth usage percentage is not less than the bandwidth usage percentage thresholds, preventing the new FD or new wireless router from being connected to the wireless network.

14. The wireless network of claim 13, wherein said bandwidth management program further causes said wireless gateway controller to:

in response to determining that the second bandwidth usage percentage is less than the bandwidth usage percentage thresholds, allow the new FD or new wireless router to be connected to the wireless network.

15. The wireless network of claim 13, wherein said bandwidth management program further causes said wireless gateway controller to:

determine if a second wireless access point associated with the wireless gateway is available in the wireless network;

in response to determining that said second wireless access point associated with the wireless gateway is available in the wireless network, calculate a third bandwidth usage percentage that would be consumed by the second wireless access point and any respective wireless routers connected to the second wireless access point;

determine if the third bandwidth usage percentage is less than a respective bandwidth usage percentage threshold of the second wireless access point and wireless routers; and in response to determining that the third bandwidth usage percentage is not less than the bandwidth usage percentage thresholds, prevent the new FD or new wireless router from being connected to the wireless network.

16. The wireless network of claim 15, wherein said bandwidth management program further causes said wireless gateway controller to:
   in response to determining that the third bandwidth usage percentage is less than the bandwidth usage percentage thresholds, allow the new FD or new wireless router to be connected to the wireless network.

17. The wireless network of claim 13, wherein said bandwidth management program further causes said wireless gateway controller to:
   trigger the first wireless access point to transmit the connected device data;
   receive, at said wireless gateway controller, the connected device data from the first wireless access point; and
   retrieve at least one device weight for the first wireless access point, the wireless routers and the FDs.

18. The wireless network of claim 17, wherein said bandwidth management program further causes said wireless gateway controller to calculate the second bandwidth usage percentage that would be consumed by the first wireless access point and the wireless routers if the new FD or new wireless router were connected to the wireless network based on the connected device data and the connected device weights.

* * * * *